(12) United States Patent
Anschicks et al.

(10) Patent No.: US 7,215,050 B2
(45) Date of Patent: May 8, 2007

(54) FIXING UNIT FOR AN ELECTRIC MOTOR

(75) Inventors: Rolf Anschicks, Butzbach (DE); Michael Rennen, Bad Soden (DE)

(73) Assignee: Siemens AG, München (DE)

( * ) Notice: Subject to any disclaimer, the term of this patent is extended or adjusted under 35 U.S.C. 154(b) by 73 days.

(21) Appl. No.: 10/896,030

(22) Filed: Jul. 22, 2004

(65) Prior Publication Data

US 2004/0256934 A1 Dec. 23, 2004

Related U.S. Application Data

(63) Continuation of application No. PCT/DE03/00411, filed on Feb. 12, 2003.

(30) Foreign Application Priority Data

Feb. 18, 2002 (DE) ............................... 102 06 692

(51) Int. Cl.
*H02K 11/00* (2006.01)
(52) U.S. Cl. .......................................... 310/71; 310/51
(58) Field of Classification Search .................. 310/51, 310/71, 89
See application file for complete search history.

(56) References Cited

U.S. PATENT DOCUMENTS

| | | | |
|---|---|---|---|
| 5,089,735 A | | 2/1992 | Sawaguchi et al. |
| 5,306,974 A | * | 4/1994 | Bates ....................... 310/68 R |
| 5,528,093 A | | 6/1996 | Adam et al. |
| 5,563,462 A | * | 10/1996 | Strobl et al. ................... 310/71 |
| 5,747,901 A | * | 5/1998 | Harada et al. ................. 310/71 |
| 6,975,059 B2 | * | 12/2005 | Sakai et al. .................... 310/71 |
| 2001/0017495 A1 | | 8/2001 | Sato et al. |

FOREIGN PATENT DOCUMENTS

| | | |
|---|---|---|
| DE | 3604675 A1 | 8/1987 |
| DE | 4136924 A1 | 5/1993 |
| DE | 4440942 A1 | 6/1995 |
| DE | 19505557 A1 | 8/1996 |
| DE | 19623258 A1 | 12/1997 |
| EP | 0215299 A2 | 3/1987 |
| EP | 0359603 A1 | 3/1990 |
| EP | 0688087 A1 | 12/1995 |

OTHER PUBLICATIONS

Derwent Abstract—DE-19623258A1; Dec. 18, 1997; ITT Automotive Europe GmbH, D60488 Frankfurt, Germany.
Derwent Abstract—DE-19505557A1; Aug. 22, 1996; ebm Elektrobau Mulfingen GmbH & Co. D-74673 Mulfingen, Germany.

(Continued)

*Primary Examiner*—Thanh Lam
(74) *Attorney, Agent, or Firm*—John Musone

(57) ABSTRACT

The invention relates to a fixing unit comprises a multi-part, electrically conductive base body provided with connections for the electric power supply of the electrically conductive basebody and additional connections for the electric motor and which is arranged in an electrically non-conductive support comprising at least two fixing holes. The multi-part, electrically conductive base body and the electrically non-conductive support are provided with a common recess.

10 Claims, 3 Drawing Sheets

OTHER PUBLICATIONS

Derwent Abstract—DE-4136924A1; May 13, 1993; Braun AG; D-6000 Frankfurt, Germany.

Derwent Abstract—DE-3604675A1; Aug. 20, 1987; Licentia Patent-Verwaltungs-GmbH, D-6000 Frankfurt, Germany.

Derwent Abstract—EP-0215299A2; Mar. 25, 1987; Robert Bosch GmbH;P.B.50, D-7000 Stuttgart, Germany.

Derwent Abstract—DE-4440942A1; Jun. 1, 1995; Valeo Equipements Electriques Moteur, Créteil, France.

Derwent Abstract—EP-0359603A1; Mar. 21, 1990; Mitsuba Electric MFG. Co. Ltd; JP-Kiryu-shi Gumma-ken, Japan.

Derwent Abstract—EP-0688087A1; Dec. 20, 1995; Emerson Electric Col, US-St. Louis Missouri 63136, USA.

* cited by examiner

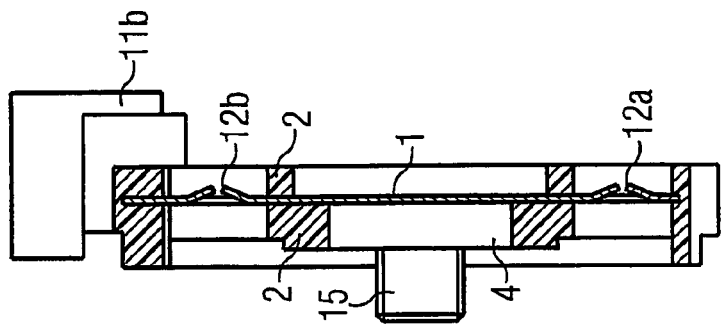
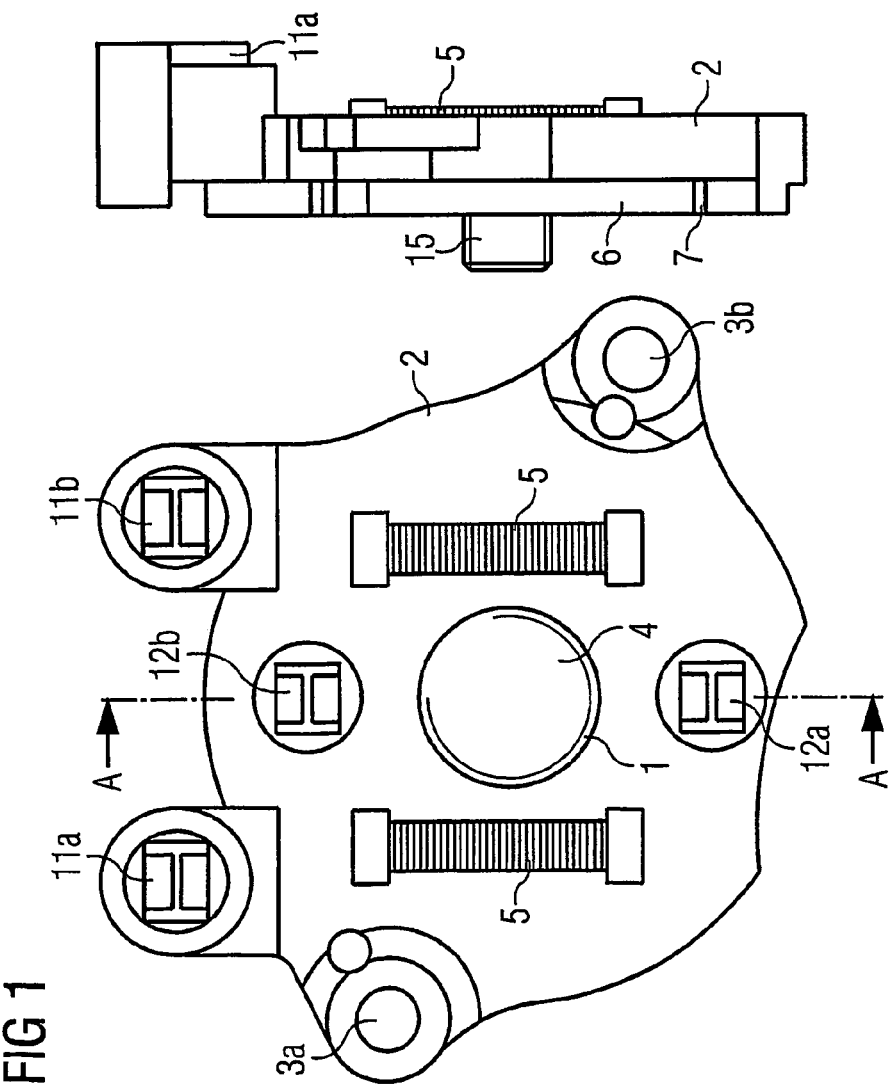

FIXING UNIT FOR AN ELECTRIC MOTOR

CROSS REFERENCE TO RELATED APPLICATIONS

The present invention is a continuation of international application PCT/DE03/00411, filed Feb. 12, 2003, which designated the United States, and further claims priority to German application 10206692.2, filed Feb. 18, 2002, the both of which are herein incorporated by reference.

BACKGROUND OF THE INVENTION

The invention relates to a fixing unit for an electric motor which comprises a multipart, electrically conductive basic body which has connections for the power supply to the multipart, electrically conductive basic body and further connections for the electric motor and which is arranged in an electrically nonconductive support which has at least two fixing holes, in which unit the multipart, electrically conductive basic body and the electrically nonconductive support have a common recess.

Devices for fixing electric motors are known. They generally comprise two bodies which are arranged directly next to each other and are usually made in the form of plates. One body in this case assumes the function of fastening and orienting the electric motor on a housing. The other body is provided with the electrical connections which ensure the power supply to the electric motor. The known devices for fixing and orienting electric motors have in this case the disadvantage that they require a relatively large volume as an installation space. In addition, assembly is relatively complex, since the two basic bodies have to be positioned in a special way in relation to each other.

A fixing unit of the type described at the beginning is known from EP 0215 to 59. In the case of this solution, no coils for suppressing interference are described, i.e. they must be provided inside the motor and require installation space there, or they must be fitted separately.

SUMMARY OF THE INVENTION

Against this background, the invention is based on the object of providing a device for fixing an electric motor with interference suppression coils which can be fitted more easily.

The object on which the invention is based is achieved by a fixing unit for an electric motor of the type described at the beginning in which two coils are arranged in the multipart, electrically conductive basic body.

The fixing unit is suitable for fixing electric motors of any type, for example for fixing a DC electric motor. The multipart, electrically conductive basic body comprises at least two parts. It is arranged in an electrically nonconductive support, the latter surrounding the multipart, electrically conductive basic body virtually completely, thereby creating a fixing unit. The electrically nonconductive support has at least two fixing holes, which do not necessarily have to be made in a circular form. However, it is preferred for a circular form of hole with a diameter >2 mm to be realized. Generally, two fixing holes are sufficient. They serve exclusively for fastening the fixing unit on a housing or mount. The common recess is likewise a kind of hole in the fixing unit, in which the bearing plate of the electric motor is arranged.

According to the invention, two coils are arranged in the multipart, electrically conductive basic body. Each coil is in this case arranged at least in part of the multipart, electrically conductive basic body and, when electric current is applied, is flowed through by the electric current. In this way, the fixing unit can serve for suppressing interference without involving extra effort during assembly and consequently improve the electromagnetic compatibility. In this case, it is possible for the coils to protrude out of the electrically nonconductive support. This takes place according to customer requirements.

It has been found in a surprising way that the combination of the multipart, electrically conductive asic body with the electrically nonconductive support to form a unit has the effect that installation space is saved, so that both the power supply and the fastening or fixing of the electric motor on a housing can be realized in a relatively simple way by one unit made from individual parts.

A preferred configuration of the invention consists in that the multipart, electrically conductive basic body comprises at least two sheet metal pieces. Suitable in this case as sheet metal pieces are sheet metal strips with a thickness of 0.1 to 2 mm. The sheet metal pieces can be worked into the electrically nonconductive support in a particularly simple way, which simplifies the production of the fixing unit.

According to a further preferred configuration of the invention, the electrically nonconductive support consists of plastic. In this case, it is advantageous that, during the production of the fixing unit, the electrically nonconductive support can be incorporated around the multipart, electrically conductive basic body as part of an injection-molding process, which likewise facilitates the production of the fixing unit.

According to a further preferred configuration of the invention, the fixing holes run at least partly through the multipart, electrically conductive basic body. This means that one or more fixing holes also run through the multipart, electrically conductive basic body. In this case it is advantageous that the fastening of the electric motor on a housing or mount by means of the fixing holes can be made more stable if the multipart, electrically conductive basic body is incorporated in the fixing.

According to a further preferred configuration of the invention, the common recess is centrally arranged. This facilitates the arrangement of the electric motor in the fixing unit and at the same time leads to uniform loading of the connecting elements with which the fixing unit is fastened on housing parts by means of the fixing holes.

According to a further configuration of the invention, the further connections for the electric motor are arranged closer to the common recess than the connections for the power supply to the multipart, electrically conductive basic body. This allows the power supply to the electric motor to be made relatively simple.

According to a further preferred configuration of the invention, a plastic ring is arranged on one side of the electrically nonconductive support. This plastic ring serves in an advantageous way for additional external fixing of the electric motor to the fixing unit. The fixing of the electric motor by the common recess is strengthened as a result.

According to a further configuration of the invention, the plastic ring has protuberances on its broad side facing away from the common recess. These protuberances, which are generally made in a virtually semicircular form, additionally strengthen the fixing of the electric motor on the plastic ring in a particularly advantageous way, it being possible at the same time for an orientation or coaxial positioning to be achieved.

A further preferred configuration of the invention consists in that the connections for the power supply to the multipart, electrically conductive basic body or the further connections for the electric motor are made as clamping connections. It is consequently possible that only the connections for the power supply to the multipart, electrically conductive basic body or only the further connections for the electric motor or both types of connections are made as clamping connections. In this case, it is advantageous that the electrical contacting can take place relatively quickly, which facilitates the arrangement of the fixing unit in components.

According to a further preferred configuration of the invention, at least one projection is arranged on the electrically nonconductive support. The arrangement of this projection may in this case take place according to customer requirements at various locations of the electrically nonconductive support. Depending on the type of construction of the housing in which the fixing unit is to be positioned or depending on the type of construction of the electric motor which is to be fixed by the fixing unit, this projection is correspondingly configured in the manner of a web, which likewise leads to an improvement of the fixing.

Finally, the invention relates to the use of the fixing unit for fixing an electric motor in a throttle valve body. The arrangement of the fixing unit in a throttle valve body is particularly advantageous, since there is generally little installation space available in the throttle valve body, which initially leads to problems when fixing the electric motor for actuating the throttle valve. These problems can largely be avoided in an advantageous way by arranging the fixing unit in a throttle valve body.

BRIEF DESCRIPTION OF THE SEVERAL VIEWS OF THE DRAWINGS

The invention is explained in more detail and by way of example below on the basis of the drawings.

FIG. 1 shows the fixing unit in the front view and side view.

FIG. 2 shows the fixing unit in the section A-A according to FIG. 1.

DETAILED DESCRIPTION OF THE INVENTION

Figure 4:
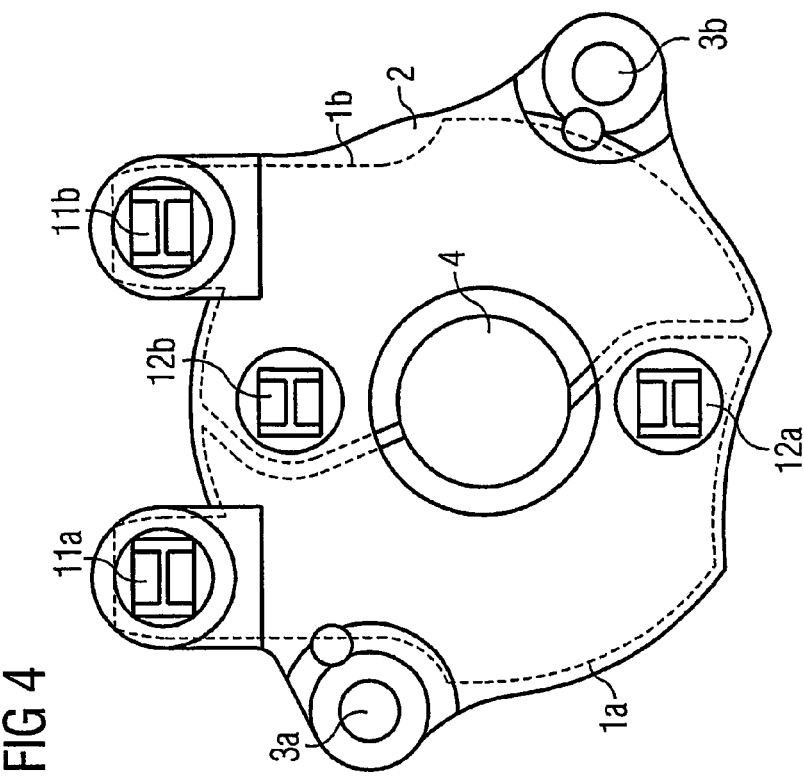
FIG. 4 shows the front view of the fixing unit with the electrically nonconductive support.

In FIG. 1, a fixing unit for an electric motor, which comprises a multipart, electrically conductive basic body 1, which has connections 11a, 11b for the power supply to the electrically conductive basic body 1 and further connections 12a, 12b for the electric motor and which is arranged in an electrically nonconductive support 2, which has fixing holes 3a, 3b, in which unit the multipart, electrically conductive basic body 1 and the electrically nonconductive support 2 have a common recess 4, is respectively represented in the front view and in the side view. The fixing holes 3a, 3b serve exclusively for fastening the fixing unit on a housing by means of commercially available fastening elements. In the common recess 4, which is made centrally, the multipart, electrically conductive basic body 1 projects slightly, which is due to the punching operation. In a particularly advantageous way, the electrically nonconductive support 2 is produced from plastic. Arranged in the multipart, electrically conductive basic body 1 are two coils 5, which protrude beyond the electrically nonconductive support 2 and consequently project out of the fixing unit. They serve for improving the electromagnetic compatibility, and consequently act as inductors. The further connections 12a, 12b for the electric motor lie closer to the common recess 4 than those connections 11a, 11b for the power supply to the multipart, electrically conductive basic body 1. A plastic ring 6 is arranged on one side of the electrically nonconductive support 2. On its broad side, facing away from the common recess 4, the plastic ring 6 has protuberances 7, which are generally made in a semicircular form and strengthen the additional fixing of the electric motor on the plastic ring 6. The connections 11a, 11b for the power supply to the multipart, electrically conductive basic body 1 or the further connections 12a, 12b for the electric motor are made as clamping connections, which ensure the contact. Arranged on the electrically nonconductive support 2 is a projection 15, which serves for improving the fixing of the electric motor. Its positioning is dependent on the structural design of the electric motor or on the structural design of the housing and is generally additionally also dependent on the respective customer requirements.

In FIG. 2, the fixing unit is represented in the section A—A according to FIG. 1. In this case, the coil has not been represented for reasons of better overall clarity. The multipart, electrically conductive basic body 1 in this case comprises at least 2 sheet metal pieces and is surrounded almost completely by the electrically nonconductive support 2.

In FIG. 31, an embodiment of the multipart, electrically conductive basic body which comprises four parts 1a, 1b, 1c, 1d is represented. Here too, the coils for increasing the electromagnetic compatibility have not been represented for reasons of overall clarity. The electric current flows via the connection 11a for the power supply to the multipart, electrically conductive basic body to the further connection 12a for the electric motor and is taken away from the system again via the connection 11b for the power supply to the multipart, electrically conductive basic body. The parts 1c and 1d are arranged around the fixing holes of the electrically nonconductive support (not represented) and consequently improve the fixing with the fastening means in the fixing holes.

Figure 3:
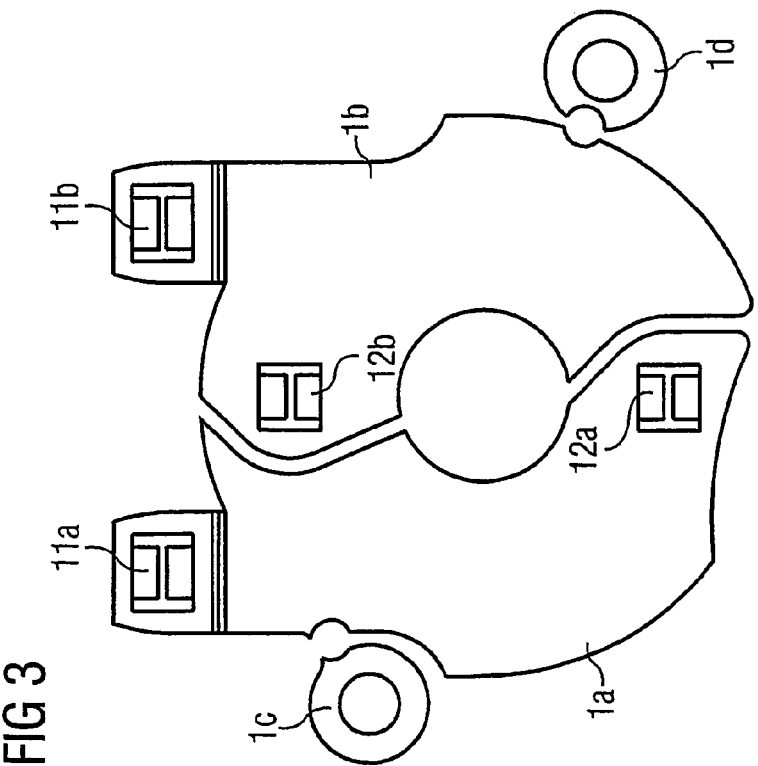
FIG. 3 shows the front view of a multipart, electrically conductive basic body.

In FIG. 4, the fixing unit with the electrically nonconductive support 2, into which the multipart, electrically conductive basic body according to FIG. 3 has been incorporated, is represented. The multipart, electrically conductive basic body is in this case represented by dashed lines. The further connections 12a, 12b for the electric motor are represented in a simplified form.

Figure 5:
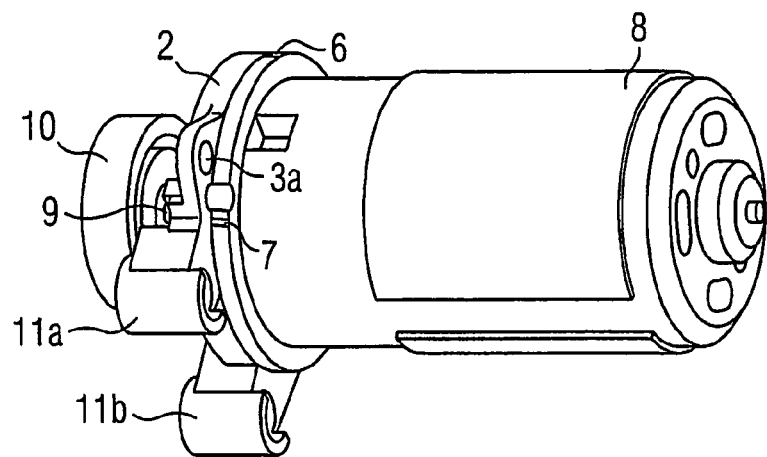
FIG. 5 shows the fixing unit on the electric motor in a three-dimensional representation.

In FIG. 5, the fixing unit is represented three-dimensionally on the electric motor 8. Arranged on the motor shaft of the electric motor 8 is the pinion 9 and a magnetic wheel 10, which is in connection with the electronic control of the electric motor 8 (not represented). The combination of the fixing unit and the electric motor 8 is fastened with the aid of the fixing hole 3a on the housing provided (likewise not represented).

Figure 6:
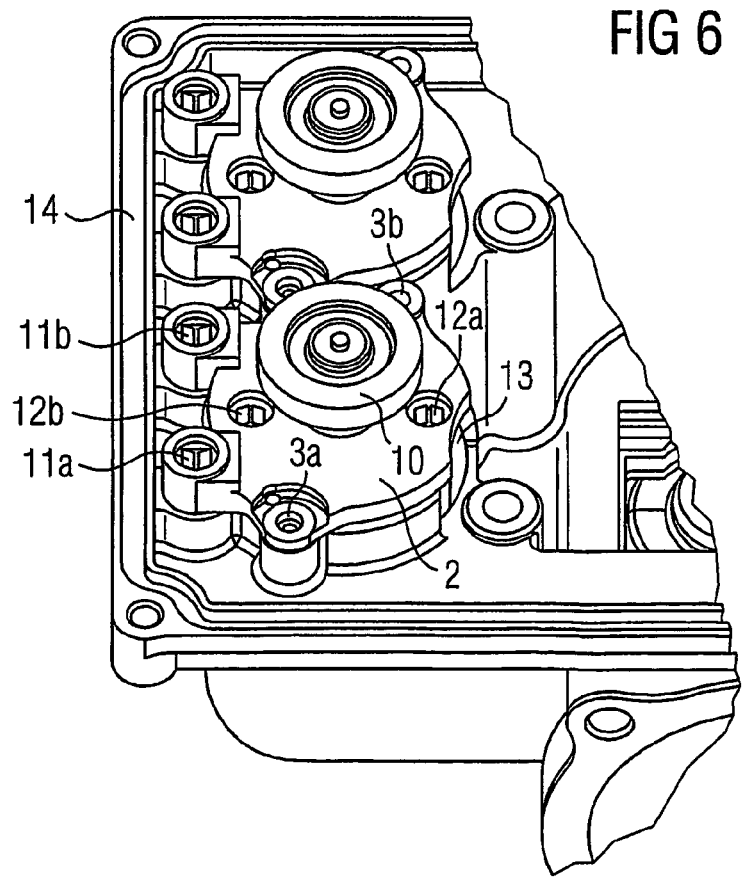
FIG. 6 shows the fixing unit arranged in a throttle valve body.

In FIG. 6, the fixing unit is represented in the installed state in a throttle valve body. The fixing unit is fixed on the housing 14 of the throttle valve body by means of the fixing holes 3a, 3b. The electric motor (not represented) is arranged in the motor compartment 13. In this case, it is possible to arrange a number of fixing units next to one another if a number of throttle valves have to be moved, as represented in FIG. 6.

We claim:

1. A fixing unit for an electric motor, comprising:
   a multipart, electrically conductive basic body including connections for the power supply to the multipart, electrically conductive basic body and further connections for the electric motor,
   an electrically nonconductive support which has at least two fixing holes for mounting the fixing unit to a structure, wherein the electrically nonconductive support is configured to couple to the electric motor to fix the electric motor to the fixing unit, wherein the multipart, electrically conductive basic body is arranged in the electrically nonconductive support, and wherein the multipart, electrically conductive basic body and the electrically nonconductive support have a common recess, and
   two coils arranged in the multipart, electrically conductive basic body.

2. The fixing unit according to claim 1, wherein the multipart, electrically conductive basic body comprises at least two sheet metal pieces.

3. The fixing unit according to claim 1, wherein the electrically nonconductive support comprises plastic.

4. The fixing unit according to claim 1, wherein the fixing holes run at least partly through the multipart, electrically conductive basic body.

5. The fixing unit according to claim 1, wherein the common recess is centrally arranged.

6. The fixing unit according to claim 5, wherein the further connections far the electric motor are arranged closer to the common recess than the connections for the power supply to the electrically conductive basic body.

7. The fixing unit according to claim 1, wherein a plastic ring is arranged on one side of the electrically conductive support.

8. The fixing unit according to claim 7, wherein the plastic ring comprises protuberances on its broad side facing away from the common recess.

9. The fixing unit according to claim 1, wherein the connections for the power supply to the multipart, electrically conductive basic body or the further connections for the electric motor are clamping connections.

10. The fixing unit according to claim 1, wherein at least one projection is arranged on the electrically nonconductive support.

* * * * *